(12) United States Patent
Park et al.

(10) Patent No.: US 8,379,714 B2
(45) Date of Patent: *Feb. 19, 2013

(54) DIGITAL BROADCAST TRANSMITTER/RECEIVER HAVING IMPROVED RECEIVING PERFORMANCE AND SIGNAL PROCESSING METHOD THEREOF

(75) Inventors: Eu-jun Park, Seoul (KR); Yong-sik Kwon, Seoul (KR); Yeon-woo Lee, Seoul (KR); Jin-hee Jeong, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1145 days.

This patent is subject to a terminal disclaimer.

(21) Appl. No.: 12/261,181

(22) Filed: Oct. 30, 2008

(65) Prior Publication Data
US 2009/0055710 A1 Feb. 26, 2009

Related U.S. Application Data

(63) Continuation of application No. 11/416,203, filed on May 3, 2006, now Pat. No. 7,711,045.

(60) Provisional application No. 60/698,500, filed on Jul. 13, 2005.

(51) Int. Cl.
*H04B 1/66* (2006.01)

(52) U.S. Cl. .................. 375/240.01; 375/285; 375/296; 375/349; 348/425.3; 348/432.1; 348/460; 348/473

(58) Field of Classification Search .................. 375/219, 375/222, 240.01, 262, 264, 265, 277, 285, 375/295, 296, 301, 316, 321, 340, 341, 346, 375/349; 348/14.13, 385.1, 393.1, 395.1, 348/397.1, 400.1, 403.1, 425.3, 432.1, 460, 348/473, 474; 370/912, 916
See application file for complete search history.

(56) References Cited

U.S. PATENT DOCUMENTS

| 5,771,239 | A | 6/1998 | Moroney et al. |
| 6,674,805 | B1 | 1/2004 | Kovacevic et al. |

(Continued)

FOREIGN PATENT DOCUMENTS

| CN | 1582580 A | 2/2005 |
| KR | 2005-111535 | 11/2005 |

(Continued)

OTHER PUBLICATIONS

U.S. Appl. No. 12/467,859, filed May 18, 2009, Eui-jun Park et al., Samsung Electronics Co., Ltd.

(Continued)

*Primary Examiner* — Dac Ha
(74) *Attorney, Agent, or Firm* — Sughrue Mion, PLLC

(57) ABSTRACT

A digital broadcast transmitter/receiver, and a signal processing method thereof, includes a randomizer randomizing a dual transport stream which includes a normal data packet and a robust data packet and into which stuff bytes are inserted, a stuff-byte exchanger replacing the stuff bytes of the randomized data with known data, a first RS encoder performing RS-encoding of data output from the stuff-byte exchanger, a packet formatter performing an interleaving of the robust packet of the data output from the first RS encoder and reformatting the packet, an interleaver interleaving data output from the packet formatter, a trellis encoder performing a trellis encoding of interleaved data, a second RS encoder changing a parity by performing an RS encoding of the robust data of the trellis-encoded data, and a modulator modulating data output from the trellis encoder and RF up-converting the modulated data.

9 Claims, 13 Drawing Sheets

U.S. PATENT DOCUMENTS

| | | | |
|---|---|---|---|
| 6,778,533 | B1 | 8/2004 | Kovacevic et al. |
| 7,111,221 | B2 | 9/2006 | Birru et al. |
| 7,620,118 | B2 * | 11/2009 | Choi ............................ 375/301 |
| 7,711,045 | B2 | 5/2010 | Park et al. |
| 2001/0034867 | A1 | 10/2001 | Jaffe et al. |
| 2002/0191712 | A1 | 12/2002 | Gaddam et al. |
| 2004/0028076 | A1 | 2/2004 | Strolle et al. |
| 2004/0179139 | A1 | 9/2004 | Choi et al. |
| 2005/0111586 | A1 | 5/2005 | Kang et al. |
| 2005/0141606 | A1 | 6/2005 | Choi et al. |
| 2006/0039503 | A1 | 2/2006 | Choi et al. |
| 2006/0126733 | A1 | 6/2006 | Boyce et al. |
| 2007/0268979 | A1 * | 11/2007 | Chang et al. .................. 375/265 |
| 2008/0267307 | A1 | 10/2008 | Chang et al. |
| 2009/0060097 | A1 * | 3/2009 | Kim et al. ..................... 375/341 |
| 2010/0118208 | A1 * | 5/2010 | Limberg ....................... 348/726 |
| 2010/0316143 | A1 * | 12/2010 | Ji et al. ......................... 375/259 |

FOREIGN PATENT DOCUMENTS

| | | |
|---|---|---|
| WO | 03003747 A1 | 1/2003 |
| WO | WO 2005/115001 | 12/2005 |

OTHER PUBLICATIONS

U.S. Appl. No. 12/467,833, filed May 18, 2009, Eui-jun Park et al., Samsung Electronics Co., Ltd.

Search Report issued in Korean International Patent Application No. PCT/KR2006/002722 on Sep. 28, 2006.

Written Opinion issued in Korean International Patent Application No. PCT/KR2006/002722 on Sep. 28, 2006.

Office Action issued in Korean Patent Application No. 2006-64282 on Jul. 30, 2007.

U.S. Appl. No. 11/416,203, filed May 3, 2006, Eui-jun Park et al., Samsung Electronics Co., Ltd.

Communication dated Oct. 11, 2011 issued by the Mexican Patent Office in counterpart Mexican Patent Application No. MX/a/2008/000559.

Communication dated May 9, 2012 from the Canadian Intellectual Property Office in counterpart Canadian application No. 2680187.

Communication dated Feb. 28, 2012 from the State Intellectual Property Office of P.R. China in counterpart Chinese application No. 200910221917.3.

* cited by examiner

DIGITAL BROADCAST TRANSMITTER/RECEIVER HAVING IMPROVED RECEIVING PERFORMANCE AND SIGNAL PROCESSING METHOD THEREOF

CROSS-REFERENCE TO RELATED APPLICATIONS

This application is a continuation of application Ser. No. 11/416,203 filed on May 3, 2006 now U.S. Pat. No. 7,711,045, which claims priority from U.S. Provisional Patent Application No. 60/698,500, filed on Jul. 13, 2005 in the United States Patent and Trademark Office, the disclosures of which are incorporated herein by reference.

BACKGROUND OF THE INVENTION

1. Field of the Invention

Aspects of the present invention relate to a digital broadcast transmitter/receiver and a signal processing method thereof, and more particularly, to a digital broadcast transmitter/receiver and a signal processing method thereof which can improve the receiving performance of the receiver by inserting a known sequence into stuff bytes added to a dual stream in the digital broadcasting transmitter which transmits the dual stream, and transmitting the dual stream with the inserted known sequence.

2. Description of the Related Art

An ATSC (Advanced Television Systems Committee) VSB system, which is an American-type digital terrestrial broadcasting system, is a signal carrier type broadcasting system. The system uses a field sync signal in the unit of 312 segments. Accordingly, the conventional digital broadcast receiver has a deteriorated receiving performance in an inferior channel environment, and especially in a Doppler-fading channel environment.

FIG. 1 is a block diagram illustrating the construction of a transmitter of a general American-type digital terrestrial broadcasting system. The digital broadcast transmitter of FIG. 1 is an EVSB (Enhanced VSB) system proposed by Philips, and can provide and transmit a dual stream obtained by adding robust data to normal data of the conventional ATSC VSB system. The digital broadcast transmitter of FIG. 1 includes a randomizer 110 for randomizing data. A first RS (Reed-Solomon) encoder 120 RS-encodes the output of the randomizer 110. A packet formatter 130 interleaves robust data of the encoded data, reformats the packet at a ½ rate, inserts a PID (Packet Identifier) value into the packet, and multiplexes the packet and normal data. An interleaver 140 interleaves the data from the packet formatter 130. A trellis encoder 150 performs an enhanced coding of the robust data at the output of the interleaver 140 and performs a ⅔-rate trellis encoding of the data. A controller 160 outputs a signal for controlling the normal data and the robust data. A second RS encoder 170 performs RS re-encoding of the enhance-coded robust data so as to be compatible with a conventional receiver and replacing a parity. A multiplexer 180 inserts a field sync signal and a segment sync signal into the trellis-coded data. A modulator 190 adds a pilot signal to the output signal of the multiplexer 180, and performs a VSB modulation and RF up-conversion of the multiplexed data.

FIG. 2 shows the format of the dual stream type data output from the transmitter of FIG. 1. Referring to FIG. 2, a dual stream type transport stream packet is composed of a 4-byte transport stream header and a 184-byte payload data. The normal data and the robust data are arranged in the payload data at predetermined intervals.

Referring to FIG. 1, the normal data and the robust data are multiplexed and input to the randomizer 110, according to the dual stream mode for transmitting the normal data and the robust data through one channel. The input data is randomized by the randomizer 110, and is input to and RS-encoded by the first RS encoder 120 so as to correct bit errors occurring due to the channel. The RS-encoded data is input to the packet formatter 130, and a robust process is performed in a manner that robust data of the encoded data is interleaved and reformatted to a packet at a ½ rate, and a PID (Packet Identifier) is inserted into the reformatted packet. This packet and normal data are then multiplexed and output to the interleaver 140. The data output from the packet formatter 130 is interleaved through the interleaver 140, and then is input to the trellis encoder 150. The robust data of the reformatted data is enhanced-coded, and then is trellis-encoded at a ⅔ rate through the trellis encoder 150. The enhance-coded robust data is then re-encoded through the second RS encoder 170 so as to be compatible with the existing receiver, and a parity replacement is performed with respect to the re-encoded data. The replaced parity is input to the trellis encoder 150. The signal having passed through the multiplexer 180 for inserting a field sync signal and a segment sync signal into the trellis-encoded data, after a pilot signal is added thereto, is VSB-modulated and RF-up-converted through the modulator 190. Here, the normal data and the robust data are controlled according to a control signal output from the controller 160.

As described above, the American-type digital terrestrial broadcasting system in FIG. 1 is constructed so that it can produce a dual stream by adding the robust data to the normal data of the existing ATSC VSB system. However, in spite of the dual stream transmission through the addition of the robust data to the normal data, the American-type digital terrestrial broadcasting system in FIG. 1 has the problem that its receiving performance in a multi-path channel is hardly improved due to the transmission of the existing normal data stream. That is, the existing digital terrestrial broadcasting system has little improvement of the receiving performance according to the improvement of the normal stream. Also, according to the American-type digital terrestrial broadcasting system, the improvement of the receiving performance in a multi-path environment is not great even with respect to the robust stream.

SUMMARY OF THE INVENTION

An aspect of the present invention is to provide a digital broadcast transmitter/receiver and a signal processing method thereof which can improve the receiving performance of the system by inserting stuff bytes into a dual stream and replacing the inserted stuff bites by known data in a transmitter side, and by detecting the known data from the received data stream in a receiver side.

Additional aspects and/or advantages of the invention will be set forth in part in the description which follows and, in part, will be obvious from the description, or may be learned by practice of the invention.

The foregoing and other objects and/or advantages are substantially realized by providing a digital broadcast transmitter, according to an aspect of the present invention, which comprises a randomizer for randomizing a dual transport stream which includes a normal data packet and a robust data packet and into which stuff bytes are inserted, a stuff-byte exchanger for replacing the stuff bytes included in data output from the randomizer by specified known data, a first RS encoder for performing an RS-encoding of data output from the stuff-byte exchanger, a packet formatter for performing an interleaving of the robust packet of the data output from the first RS encoder and reformatting the packet, an interleaver for interleaving data output from the packet formatter, a trellis encoder for performing a trellis encoding of data output from the interleaver, a second RS encoder for changing a parity by performing an RS encoding of the robust data of the trellis-encoded data, and a modulator for modulating data output from the trellis encoder and performing an RF up-converting of the modulated data.

According to an aspect of the invention, the trellis encoder includes a memory for performing the trellis encoding, and performs a memory initialization with respect to data input in the position into which the stuff bytes are inserted.

According to an aspect of the invention, the digital broadcast transmitter further comprises a stuff-byte controller for controlling the memory initialization of the trellis encoder by generating a control signal indicative of information about an insertion position of the stuff bytes.

According to an aspect of the invention, the digital broadcast transmitter further comprises a packet buffer for extracting data corresponding to the insertion position of the stuff bytes from the data output from the first RS encoder, and temporarily storing the data.

According to an aspect of the invention, the packet buffer receives data changed according to the memory initialization from the trellis encoder, and updates the temporarily stored data.

According to an aspect of the invention, the digital broadcast transmitter further comprises a parity reformatter for generating a changed parity by receiving and performing an RS encoding of the updated data from the packet buffer, and outputting the changed parity to the trellis encoder so that the parity added by the first RS encoder is replaced by the changed parity.

According to an aspect of the invention, the stuff bytes are inserted into an adaptation field of the normal data packet.

According to an aspect of the invention, information about a position and a length of the stuff bytes is inserted into a specified position of the normal data.

According to an aspect of the invention, the known data includes specified sequence having a specified pattern.

In another aspect of the present invention, there is provided a signal processing method for a digital broadcast transmitter, which comprises randomizing a dual transport stream which includes a normal data packet and a robust data packet and into which stuff bytes are inserted, replacing the stuff bytes included in data output in the randomizing step by specified known data, a first RS-encoding of data with the replaced stuff bites performing an interleaving of the robust packet of the first RS encoded data and reformatting the packet, interleaving data with the reformatted packet, performing a trellis encoding of the interleaved data output, changing a parity by performing a second RS encoding of the robust data of the trellis-encoded data, and modulating the data trellis encoded and performing an RF up-converting of the modulated data.

In still another aspect of the present invention, there is provided a digital broadcast receiver, which comprises a demodulator for receiving from a digital broadcast transmitter and demodulating a signal encoded by inserting specified known data into a specified position of a dual transport stream which includes a normal data packet and a robust data packet and into which stuff bytes are inserted, a known data output unit for detecting a position of the known data from the demodulated signal and outputting the known data, an equalizer for equalizing the demodulated signal, a Viterbi decoder for error-correcting and decoding the equalized signal using the detected known data, a deinterleaver for deinterleaving output data of the Viterbi decoder, a packet reformatter for performing a packet reformatting and deinterleaving of the robust data output from the Viterbi decoder, and a derandomizer for derandomizing output data of the deinterleaver.

According to an aspect of the invention, the known data output unit includes a known symbol detector for detecting information about the specified position into which the known data is inserted from the received signal, a segment flag generator for generating a data frame including at least one segment that indicates the position by a specified identification sign, a trellis interleaver for performing an encoding of the data frame which is performed by a digital broadcast transmitter, and a known data extractor for inserting the known data into the position of the interleaved data frame indicated by the identification sign.

According to an aspect of the invention, the known data output unit outputs the detected known data to the demodulator and the equalizer, and the demodulator and the equalizer perform the demodulating and the equalizing, respectively, using the known data.

In still another aspect of the present invention, there is provided a signal processing method for a digital broadcast receiver, which comprises receiving from a digital broadcast transmitter and demodulating a signal encoded by inserting specified known data into a specified position of a dual transport stream which includes a normal data packet and a robust data packet and into which stuff bytes are inserted, detecting a position of the known data from the demodulated signal and outputting the known data, equalizing the demodulated signal, error-correcting and decoding the equalized signal using the detected known data, deinterleaving the decoded data, performing a packet reformatting and deinterleaving of the robust data, and derandomizing output data in the deinterleaving step.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
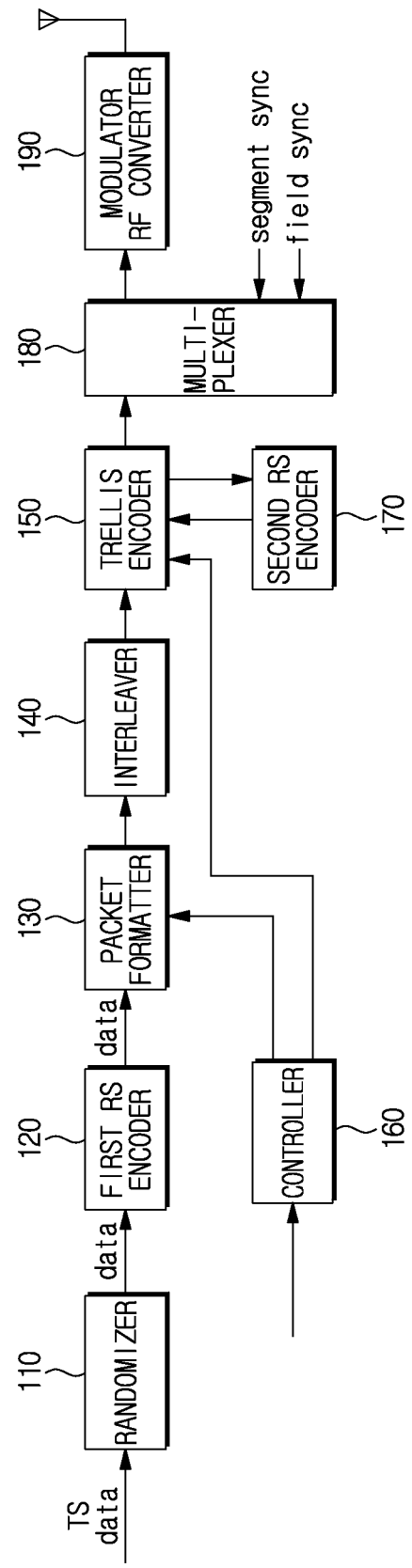
FIG. 1 is a block diagram illustrating the construction of a transmitter of a general American-type digital broadcasting (ATSC VSB) system.
Figure 2:
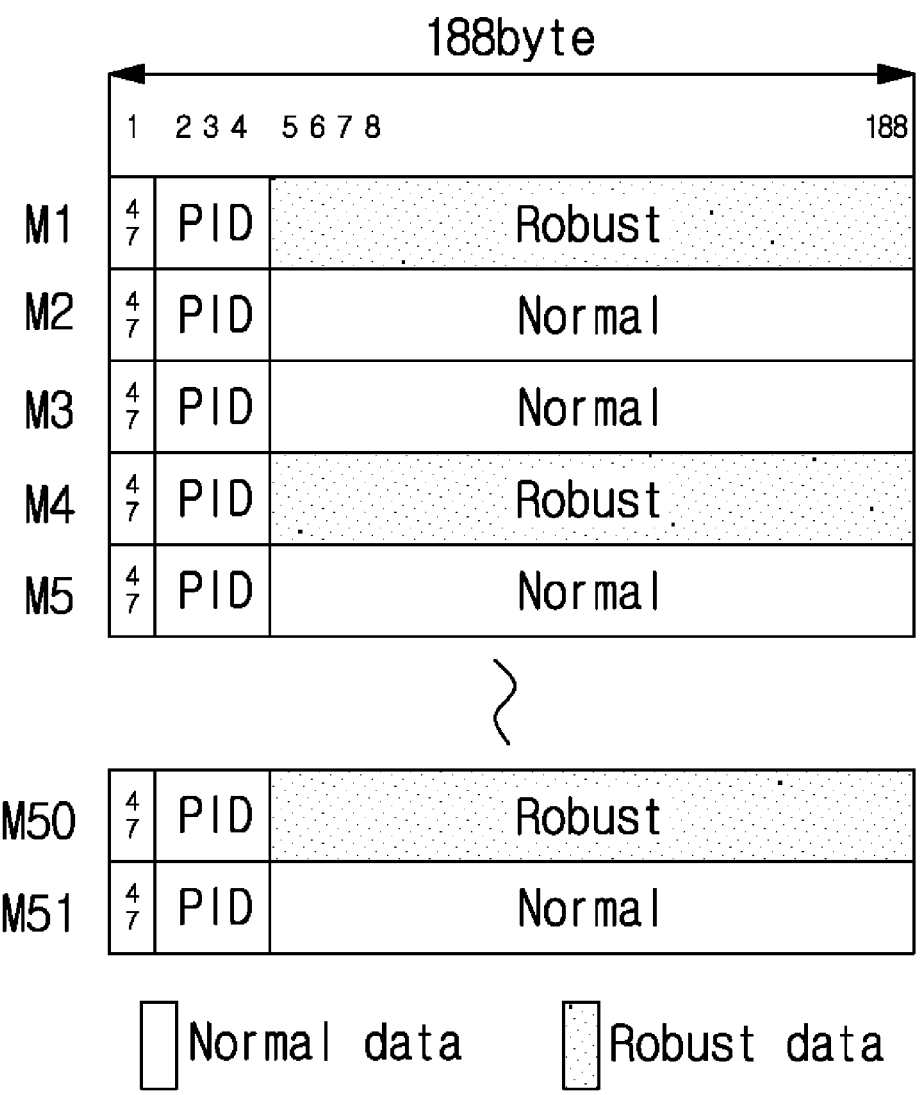
FIG. 2 is a view illustrating the format of ATSC VSB data.

Reference will now be made in detail to the present embodiments of the present invention, examples of which are illustrated in the accompanying drawings, wherein like reference numerals refer to the like elements throughout. The embodiments are described below in order to explain the present invention by referring to the figures. Also, well-known functions or constructions are not described in detail since they would obscure the invention in unnecessary detail.

Figure 3:
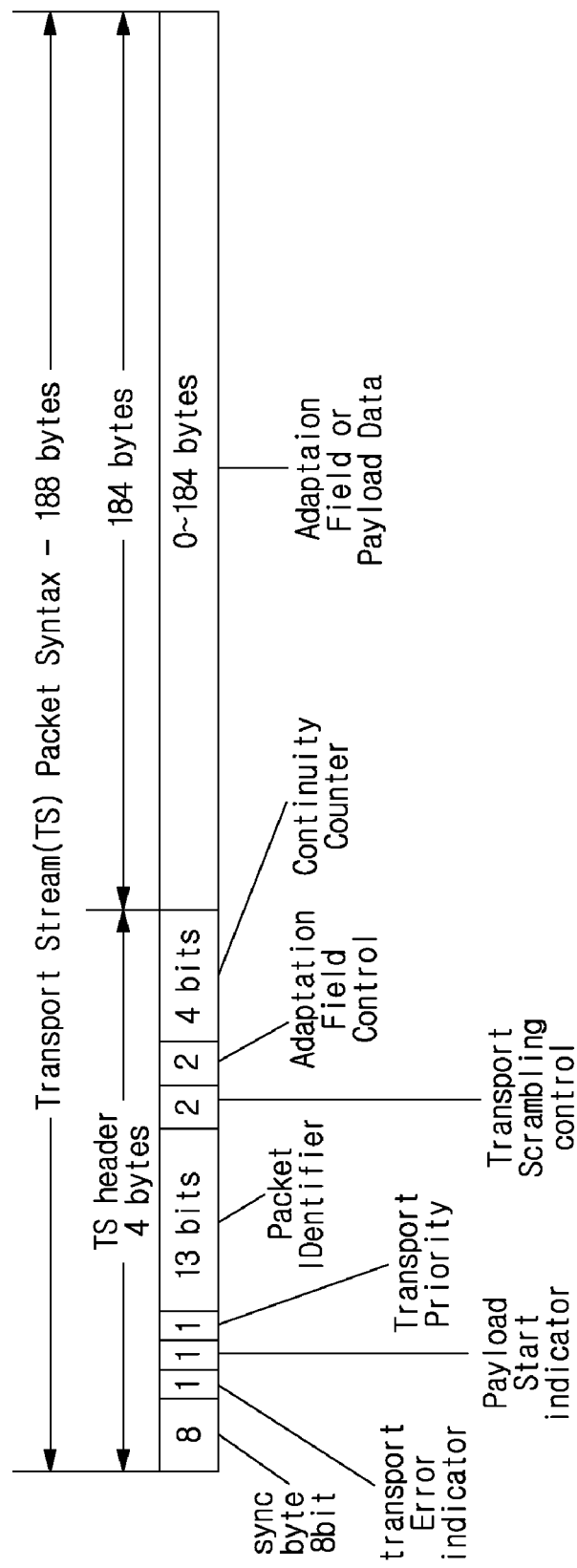
FIG. 3 is a view illustrating the structure of a transport stream (TS) packet frame.

FIG. 3 is a view illustrating the structure of a general MPEG-2 transport stream packet. Referring to FIG. 3, the general MPEG-2 transport stream packet is composed of a TS header part of 4 bytes and an adaptation field or payload data of 184 bytes. As illustrated in FIG. 3, the MPEG packet includes an 8 bit Sync_Byte, a 1 bit transport packet error indicator, a 1 bit payload unit start indicator, a 1 bit transport priority flag, a 13 bit PID (Packet Identifier) value, a 2 bit transport scrambling control indicator, a 2 bit adaptation field control indicator, and 4 bit continuity counter. A payload and/or an adaptation field follow the shown 4 bit continuity counter.

Figure 4:
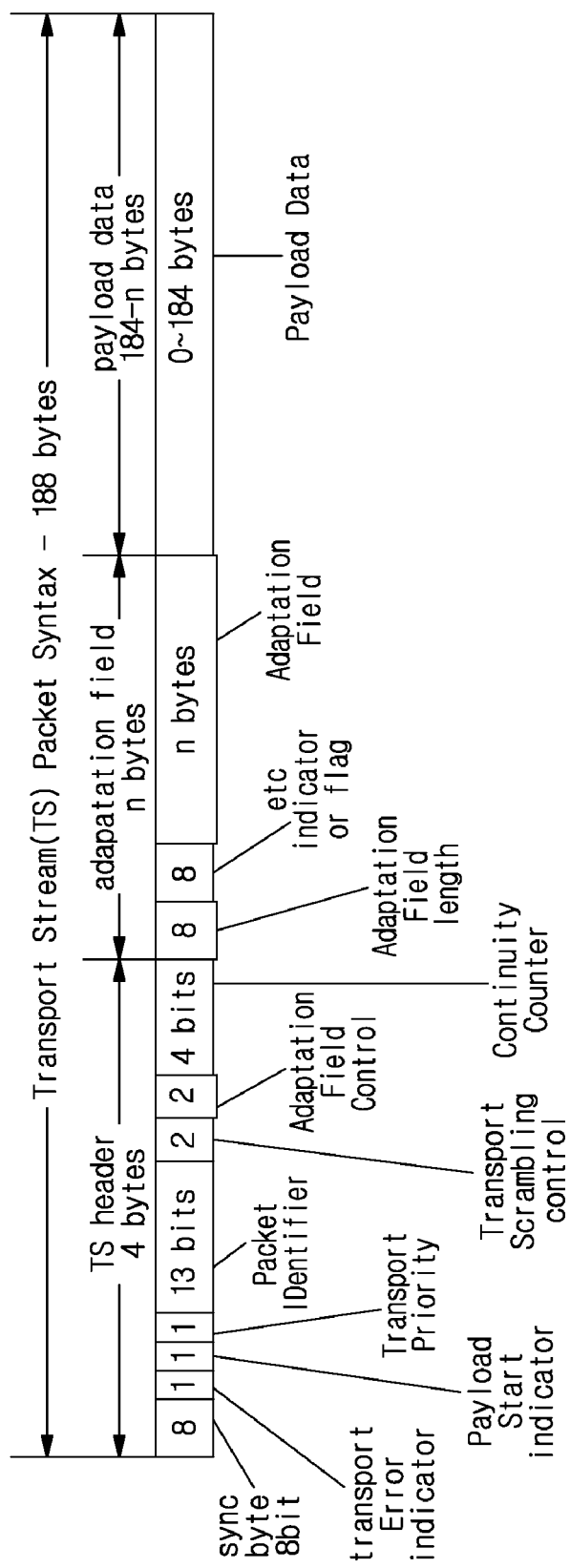
FIG. 4 is a view illustrating the structure of a TS packet frame containing stuff bytes according to an aspect of the present invention.

FIG. 4 is a view illustrating the structure of an MPEG-2 transport stream packet that includes an adaptation field to which stuff bytes are added according to an embodiment of the present invention. Referring to FIG. 4, the MPEG-2 transport stream includes a header part of 4 bytes, an adaptation field of "n" bytes, and payload data of "184−n" bytes. Two bytes of the adaptation field is an adaptation field (AF) fielder including length information of the adaptation field, and stuff bytes, which does not contain the information and simply occupies a space, is inserted after the adaptation field header. Whether the adaptation field exists is determined by the value of adaptation field control bits in the TS header of the transport stream.

Figure 5:
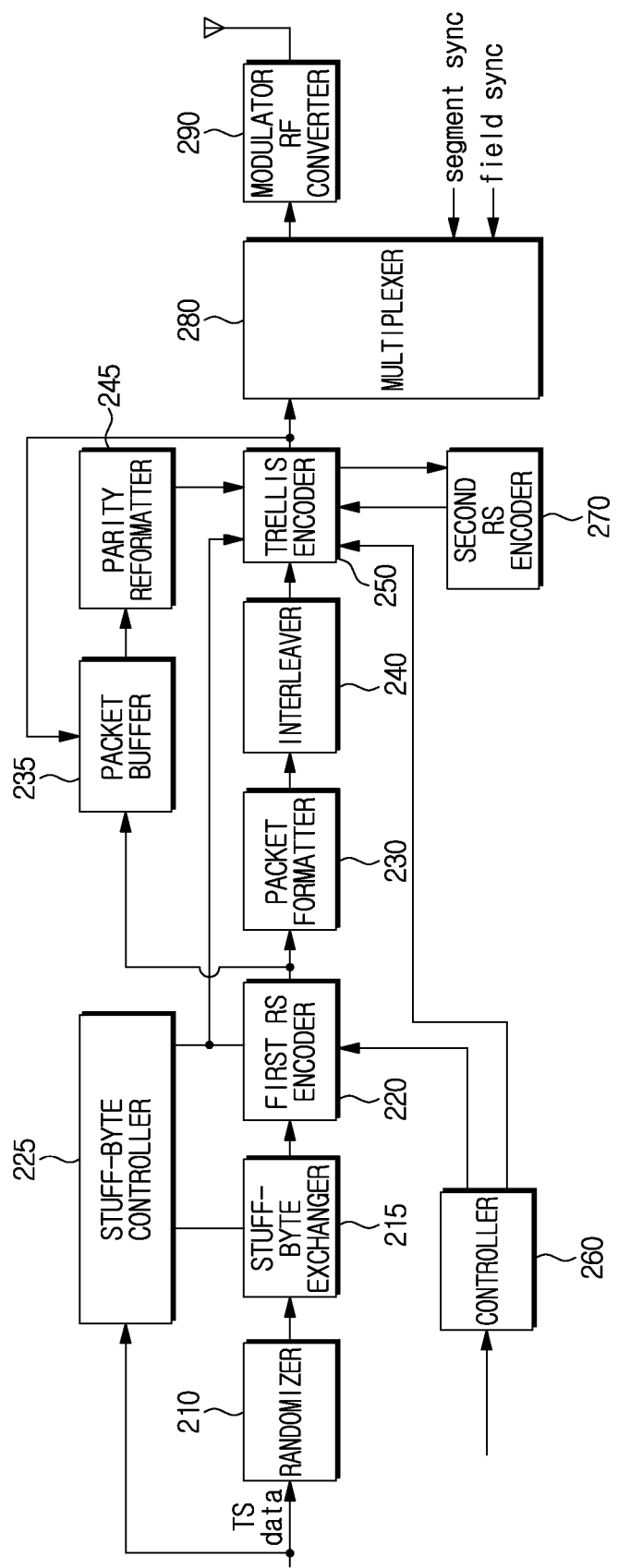
FIG. 5 is a block diagram illustrating the construction of a digital broadcast transmitter according to an aspect of the present invention.

In an aspect of the present invention, the MPEG-2 TS packet in which the stuff bytes are inserted into the adaptation filed of the transport stream, as shown in FIG. 4, is used as the input of the transmitter. FIG. 5 is a block diagram illustrating the construction of a digital broadcast transmitter according to an embodiment of the present invention. The digital broadcast transmitter in FIG. 5 forms the stuff bytes in the normal stream of the MPEG-2 transport stream in the transmitter of the EVSB system proposed by Phillips, inserts known data into the stuff bytes, and transmits the data. The receiver (not shown) detects the known data, and compensates for a distortion resulted from the channel using the detected known data.

Referring to FIG. 5, the digital broadcast transmitter includes a randomizer 210, a stuff-byte exchanger 215, a first RS encoder 220, a stuff-byte controller 225, a packet formatter 230, a packet buffer 235, an interleaver 240, a trellis encoder 250, a controller 260, a multiplexer 280, a second RS encoder 270, and a modulator/RF converter 290. While not shown, it is understood that other elements can be included in the transmitter, such as where the transmitter is further a receiver.

The randomizer 210 randomizes an input MPEG-2 transport steam data in order to heighten the utility of an allocated channel space. The data input to the randomizer 210 has the data multiplexed with the normal data that is generated by inserting the robust data processed by a robust data pre-processor (not shown) and stuff bytes, which has a specified length of bytes but does not include payload data, into a specified position of the input transport stream data. It is understood that the normal data can be AV data used for digital television. The robust data can be other data, such as games, music, software pictures, audio-video data and other like data.

The stuff-byte exchange unit 215 generates a specified sequence (hereinafter referred to as "known data") having a specified pattern prearranged between a transmitter side and a receiver side. The stuff-byte exchange unit 215 inserts the generated known data into a stuff byte position of the randomized data in replacement of the stuff bytes. The known data can easily be detected from payload data to be transmitted, and thus is used for synchronization and equalization operations in the receiver side.

The stuff-byte controller 225 receives the transport stream to which was added the stuff bytes to be input to the randomizer 210. The controller 225 detects the information about the position at which the stuff bytes were added, from the transport stream, generates a control signal to recognize a start position and an end position of the known data, and inputs the control signal to the stuff-byte exchanger 215 and the trellis encoder 250.

The first RS encoder 220 adds a parity of specified bytes to the packet data by performing an RS encoding of the packet data with respect to which the stuff bytes were exchanged by the stuff-byte exchange unit 215, in order to correct errors occurring due to the channel. The packet formatter 230 interleaves the robust data of the encoded data, reformats the packet at a ½ rate, inserts a PID (Packet Identifier) value into the packet, and multiplexes the packet and normal data. However, it is understood that rates other than the ½ rate can be used.

The interleaver 240 performs an interleaving of the data packet to which the parity output from the packet formatter 230 is added in a specified pattern. The trellis encoder 250 converts the data output from the interleaver 240 into data symbols, and performs a symbol mapping of the data symbols through a trellis encoding at a ⅔ rate. In the shown embodiment, the trellis encoder 250 initializes the value temporarily stored in its own memory device to a specified value at the start point of the known data indicated by the stuff-byte controller 225, and performs the trellis encoding of the known data. The trellis encoder 250 initializes the stored value of the memory device to, for example, a "00" state, but is not restricted thereto.

The packet buffer 235 extracts and temporarily stores the known data from the packet output from the first RS encoder 220 at the start point of the known data. If the known data is trellis-encoded in the trellis encoder 250 according to the memory initialization, the packet buffer receives the known data changed according to the memory initialization from the trellis encoder 250, temporarily stores the changed known data in replacement of the previous known data temporarily stored, and then inputs the changed known data to a parity reformatter 245.

The parity reformatter 245 performs the RS encoding of the data changed according to the initialization to generate the parity, and then outputs the generated parity to the trellis encoder 250 in replacement of the previous parity.

The controller 260 outputs the signal to control the normal data and the robust data and to coordinate the encoders 220, 250.

The second RS encoder 270 replaces the original parity by the newly generated parity by performing the RS re-encoding of the robust data, which is enhanced-coded by the trellis encoder 250, so as to also be compatible with an existing receiver. In this way, the generated signal is backwards compatible.

The multiplexer 280 inserts a segment sync signal into the data that has converted into symbols by the trellis encoder 250 in the unit of a segment, and inserts a field sync signal into the data in the unit of a field. The modulator/RF converter 290 performs a VSB modulation of the signal by adding a specified DC value to the data signal of a specified level and adding the pilot signal to an edge portion of a low frequency band of a frequency spectrum.

Figure 6:
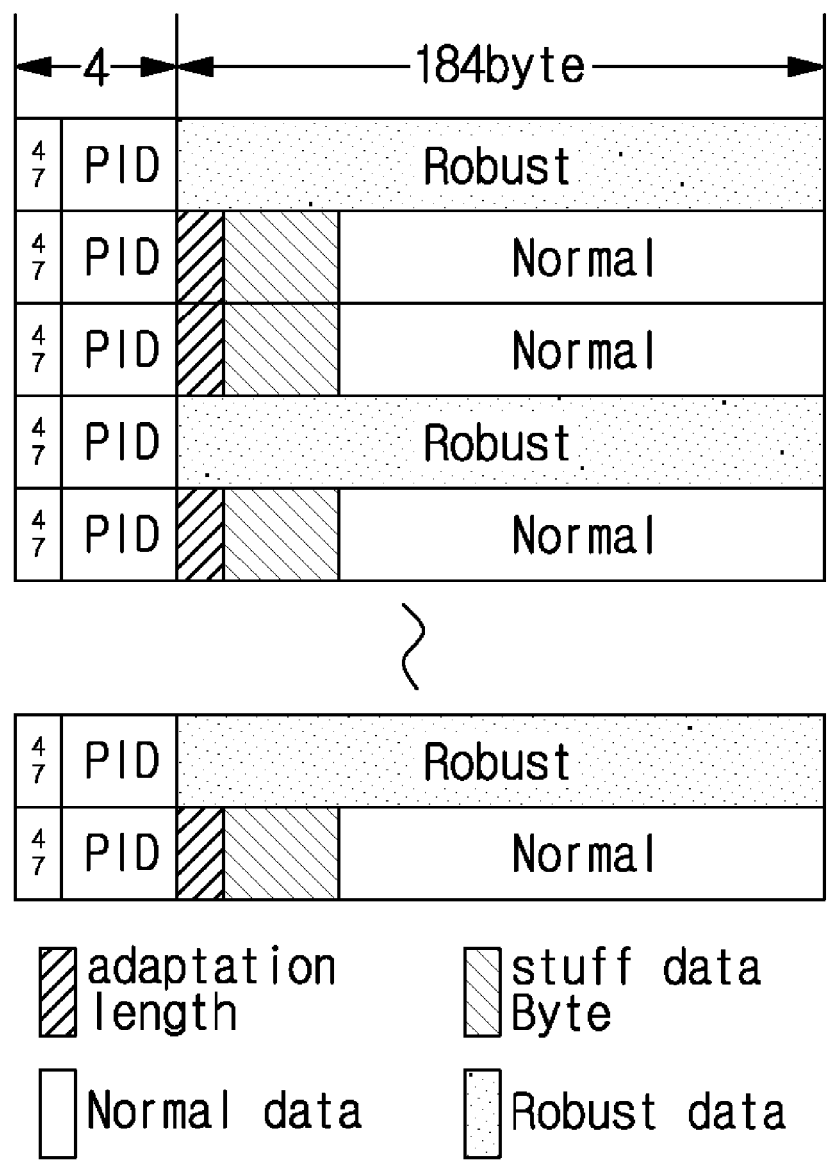
FIG. 6 is a view illustrating the data format output from the randomizer in FIG. 5 according to an aspect of the present invention.

FIGS. 6 to 9 illustrate data formats changed according to the course of processing the MPEG-2 transport packet in the digital broadcast receiver according to an aspect of the present invention. FIG. 6 shows the data format after n stuff bytes included in the normal data packet of the transport stream output from the randomizer 210 are replaced by specified sequence data by the stuff-byte exchanger 215. Referring to FIG. 6 shows the normal data packet and the robust data packet arranged at regular intervals. The known data is inserted into the adaptation field of the normal data packet, instead of the stuff bytes. As such, while shown in FIG. 6 as stuff data bytes, all or some of these bytes are replaced by the known data.

The header of MPEG-2 packet data is composed of the first byte of sync signal and three bytes including a PID (Packet Identity) value. The first two bites among the adaptation field part composed of desired bytes include the length information of the adaptation field. That is, the first two bytes of the adaptation field include the information about the stuff bytes inserted into the adaptation byte (i.e., the length of the known data). Since the start position of the known data is fixed in the packet, the receiver side can know the information about the position and length of the known data (i.e., the quantity of the known data) according to the information inserted into the first two bytes of the adaptation field.

Figure 7:
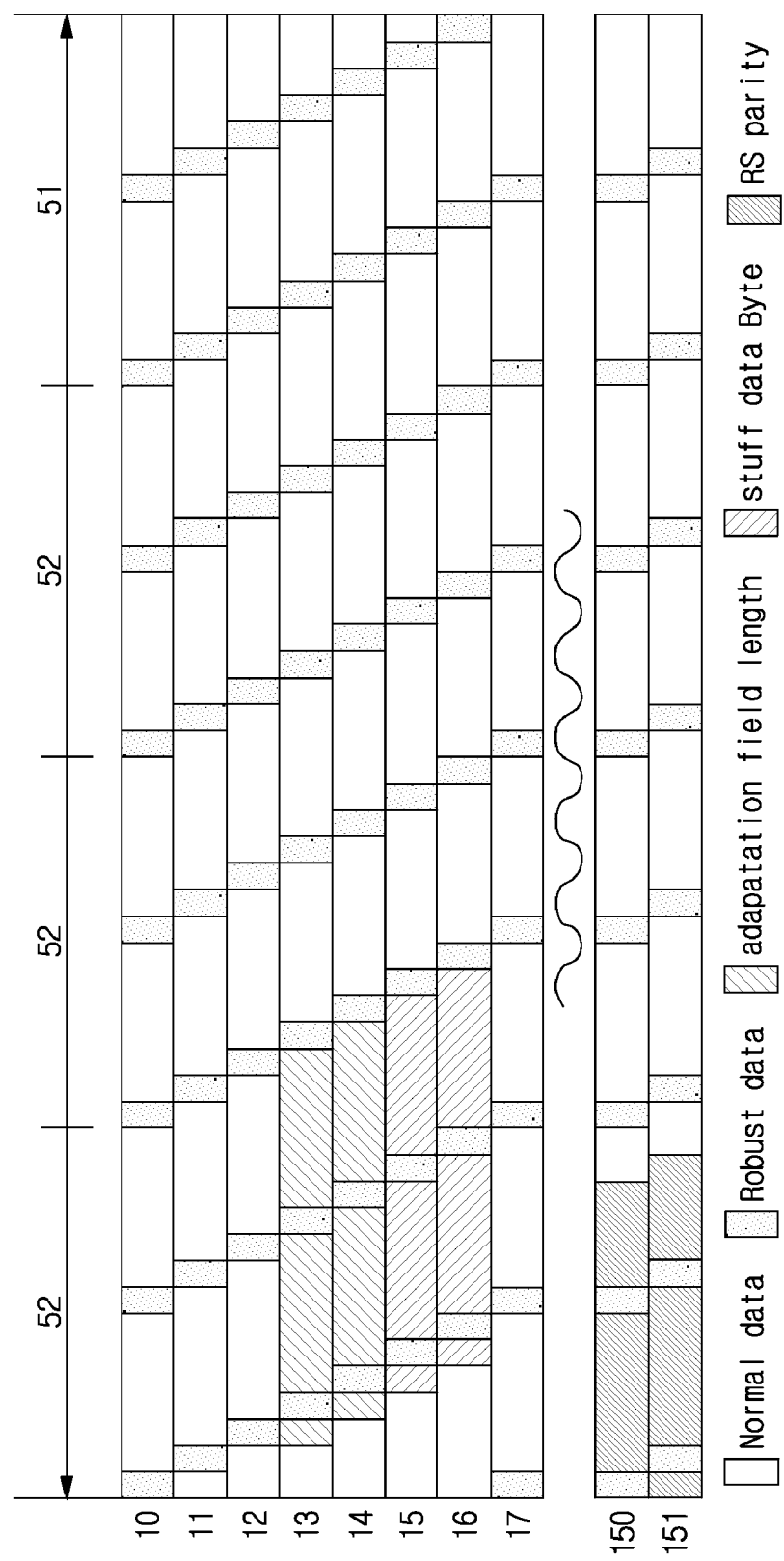
FIG. 7 is a view illustrating the data format output from the interleaver in FIG. 5 according to an aspect of the present invention.

FIG. 7 shows the data format after the data is interleaved by the interleaver 240. The MPEG-2 packet in FIG. 6 is split into 52 segments through the interleaving, as shown in FIG. 7. The data of the same byte position of the MPEG-2 packet of FIG. 6 appears in the same rows as those shown in FIG. 7, after the data interleaving.

Figure 8:
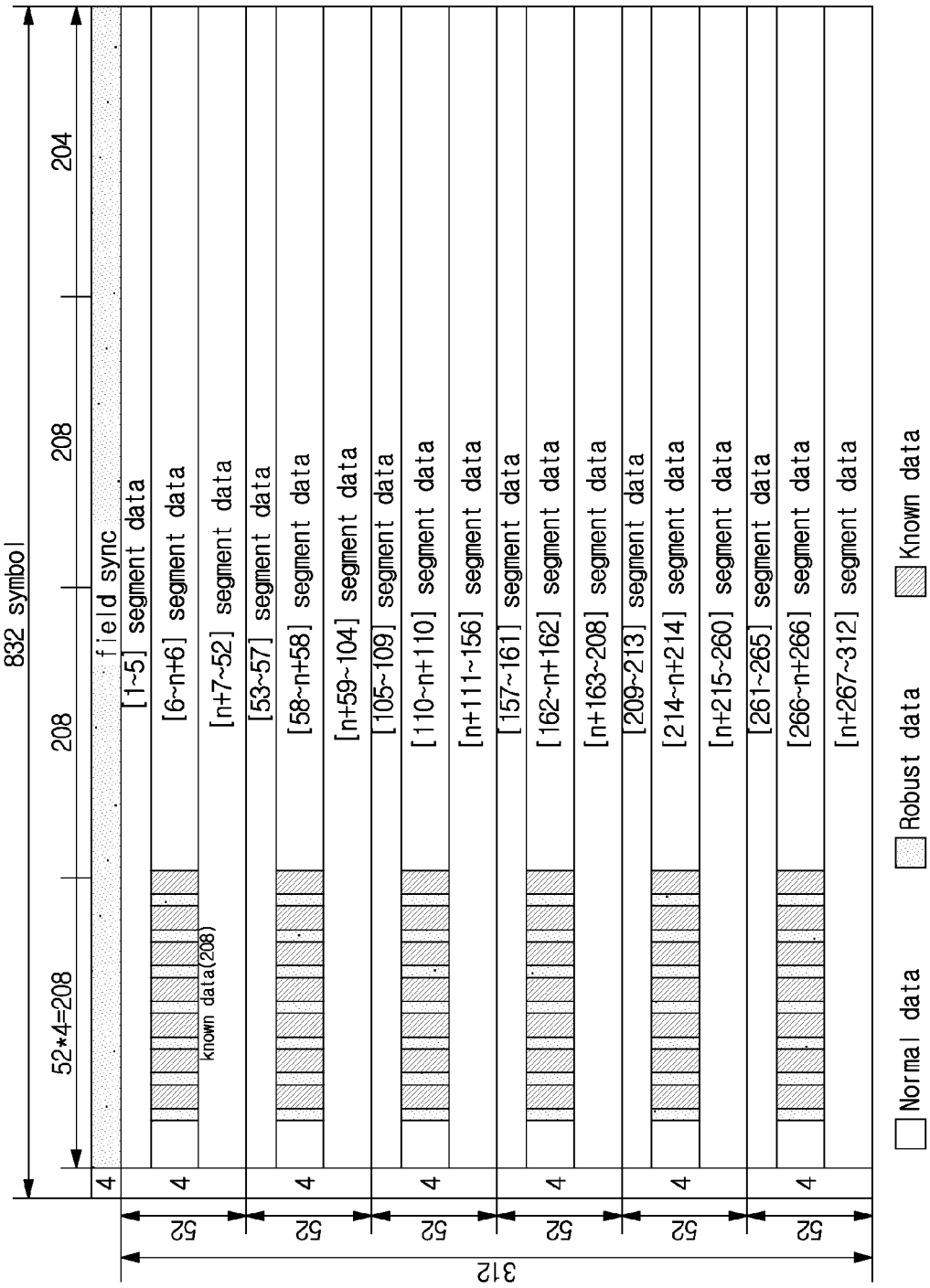
FIG. 8 is a view illustrating the data format output from the trellis encoder in FIG. 5 according to an aspect of the present invention.

FIG. 8 is a view illustrating the 12-symbol-interleaved data format encoded by the trellis encoder 250. Since one field includes six convolutional interleavers, 6 sequences including the stuff bytes appear. For example, if the stuff bytes of 10 bytes are included in the transport stream, 60(=10*6) known symbol sequences appear in one field. However, other byte numbers can be included.

Referring to the drawings, it is understood that the data positioned at the same byte position in the MPEG-2 packet is included in one data segment after the trellis encoding. Therefore, after the stuff bytes are continuously added to the specified part of the MPEG-2 packet and then randomized, the stuff-byte position is replaced by the specified known sequence. Then, if the trellis encoding is performed, the specified known sequence which has been inserted into the same byte portion is formed in one data segment. The digital broadcast receiver detects the known signal to improve the receiving performance.

Figure 9:
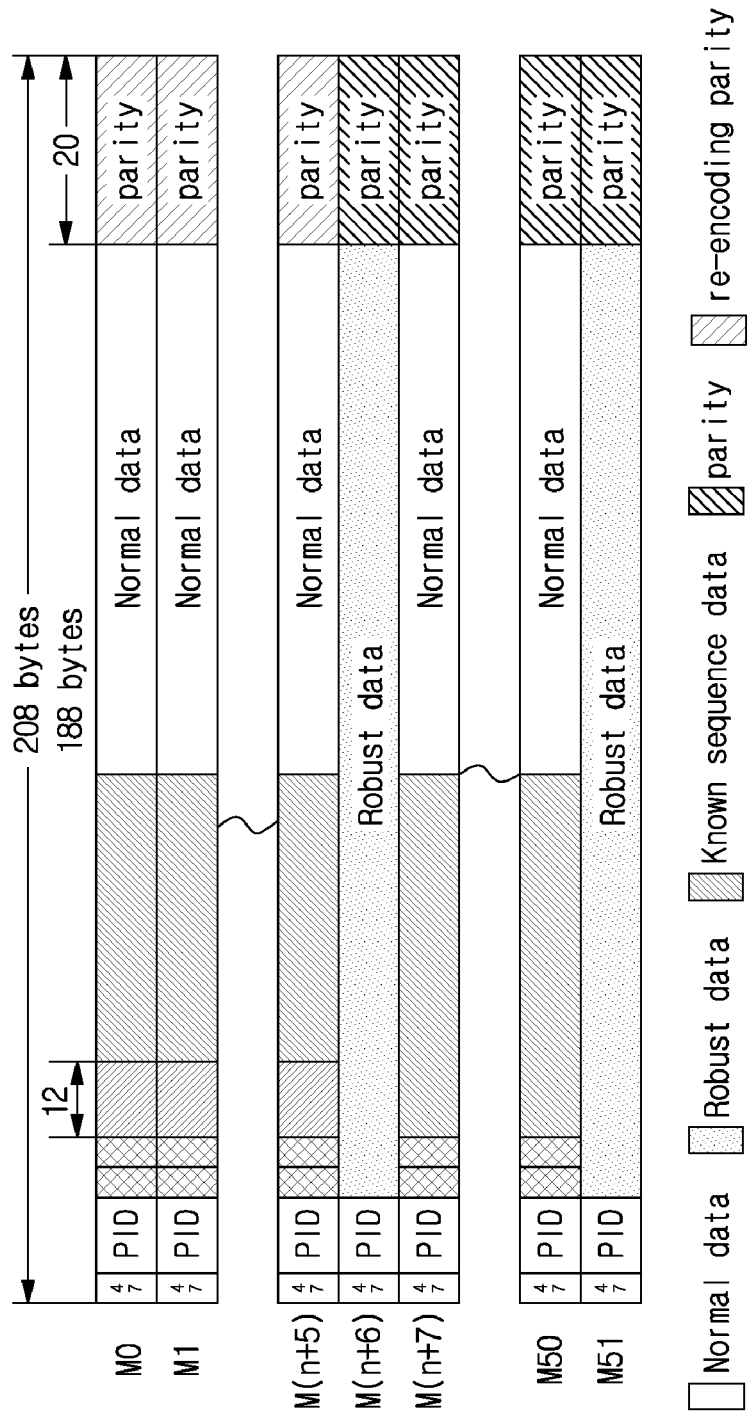
FIG. 9 is a view illustrating the data format in which a parity is reformatted according to the initialization of the trellis encoder in FIG. 5 according to an aspect of the present invention.

FIG. 9 shows the data format after the RS encoding and the parity reformatting are performed by the parity reformatter 245. The trellis encoder 250 includes a memory (not shown) for performing the trellis encoding. The trellis encoder 250 initializes the memory at the start point of the stuff bytes or known data according to the stuff byte controller 225. If the trellis encoder 250 is initialized at the start point of the symbol sequence of the known data, the output parity of the first RS encoder 220 becomes inaccurate due to the change of the data value according to the initialization. Therefore, the parity reformatter 245 generates parity by performing the RS encoding for the data changed by the memory initialization, and inputs the generated parity to the trellis encoder 250 so as to replace the previous parity. FIG. 9 shows the process of replacing the parity according to the memory initialization of the trellis encoder 250.

Figure 10:
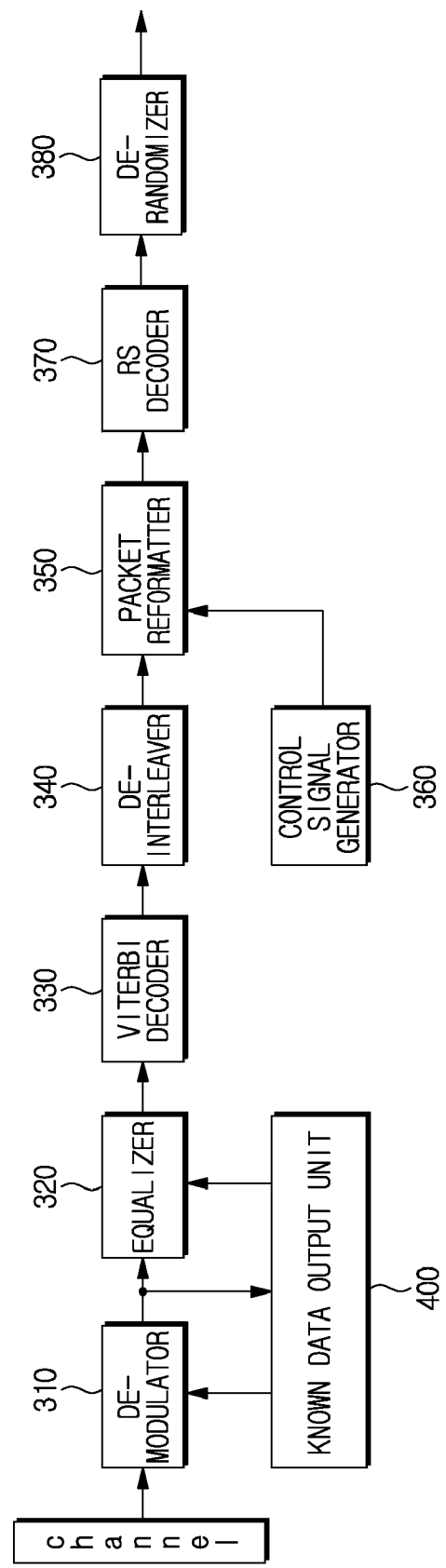
FIG. 10 is a block diagram illustrating the construction of a digital broadcast receiver according to an aspect of the present invention.

FIG. 10 is a block diagram illustrating the digital broadcast receiver according to an aspect of the present invention which corresponds to the digital broadcast transmitter in FIG. 5. The digital broadcast receiver in FIG. 10 includes a demodulator 310, an equalizer 320, a Viterbi decoder 330, a deinterleaver 340, a packet reformatter 350, a control signal generator 360, an RS decoder 370, a derandomizer 380, and a known symbol detector or known data output unit 400, and operates in the reverse process to the digital broadcast transmitter of FIG. 5, so as to demodulate the received signal. While not required, it is understood that additional elements can be included.

A tuner (not shown) converts the RF signal received through a channel into a baseband signal, and the demodulator 310 performs a detection and demodulation of the converted baseband signal. The demodulator 310 receives the known data from the known data output unit 400. The equalizer 320 compensates for a channel distortion of the demodulated signal due to the multi-path of the channel. Also, the equalizer 320 receives the known data from the known data output unit 400, and uses the received known data in compensating for the channel distortion.

The Viterbi decoder 330 corrects the error of the signal equalized by the equalizer 320, and decodes the error-corrected signal. The deinterleaver 340 rearranges the data distributed by the interleaver 240 of the digital broadcast transmitter in FIG. 5. The packet reformatter 350 demultiplexes the deinterleaved data to divide the data into the robust data and the normal data. The reformatter 350 performs a packet reformatting and deinterleaving of the robust data, and inputs the reformatted and deinterleaved robust data and the normal data to the RS decoder 370 according to the control signal generator 360.

The RS decoder 370 error-corrects the deinterleaved data, and the derandomizer 380 derandomizes the data error-corrected through the RS decoder 370, so that the data of the MPEG-2 transport stream is restored.

The known data output unit 400, according to an aspect of the invention, detects the information about the quantity of the stuff bytes inserted into the reserved portion of a field sync data segment region to obtain the information about the position of the known symbol, and outputs the known data from the obtained position information. The known data output unit 400 provides the output data to the demodulator 310 and the equalizer 320 so as to detect, sync, and compensate for the channel distortion. As shown, the known data output unit 400 receives the de-modulated data output from the de-modulator 310 to output the known data. However, it is understood that the unit 400 can be otherwise disposed.

Figure 11:
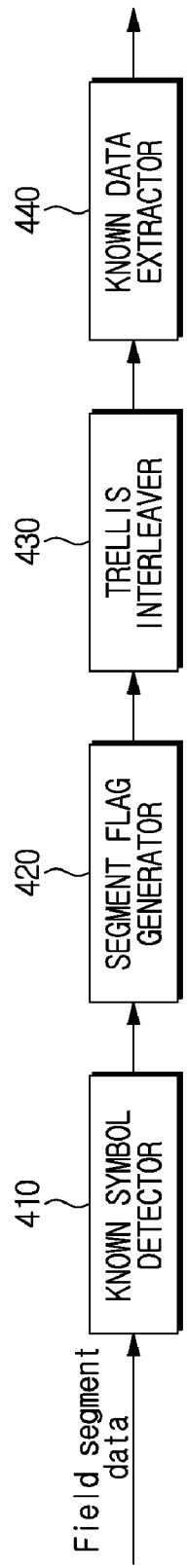
FIG. 11 is a view explaining the known data output unit in FIG. 10 according to an aspect of the present invention.

FIG. 11 is a view explaining an example of the construction of the known data output unit 400 in FIG. 10 in detail. The known data output unit 400 includes a known symbol detector 410, a segment flag generator 420, a trellis interleaver 430, and a known data extractor 440. The known symbol detector 410 detects the information about the quantity of the known data (such as that need from the adaptation field control and/or the adaptation field length). The segment flag generator 420 and trellis interleaver 430 find the position information of the known symbol according to the detected quantity information. The known data extractor 440 outputs the known data from the obtained position information which is used to improve the receiving performance of the digital broadcast receiver of FIG. 10. If the quantity of the stuff bytes is known, the segment flag generator 420 and the trellis interleaver 430 may alternately be embodied by using a counter and control logic, since the position of the stuff byte is always fixed.

The known symbol detector 410 extracts the information about the position of the known data from the control information bit that includes the length of the adaptation field of the demodulated data header part. Here, the information about the position of the known data includes the information about the length of the known data, and because the position of the known data is predetermined, the position and the number of known symbols according to the encoding of the known data can be derived from the indicated length of the known data. However, it is understood that such information can be directly encoded as start/stop positions where the known data is variably located.

The segment flag generator 420 generates at least one segment for indicating the corresponding position according to the position and the number of the known symbols by marking an identification sign that corresponds to the number of symbols, and generates the MPEG-2 transport stream that includes such a segment. The trellis interleaver 430 performs the encoding of the transport frame generated by the segment flag generator 420 in the same manner as the interleaving process performed by the transmitter side as shown in FIG. 5. The known data extractor 440 inserts the predefined known data into the position corresponding to the known symbol among the transport frame output from the encoding process of the trellis interleaver 430 according to the identification sign.

Figure 12:
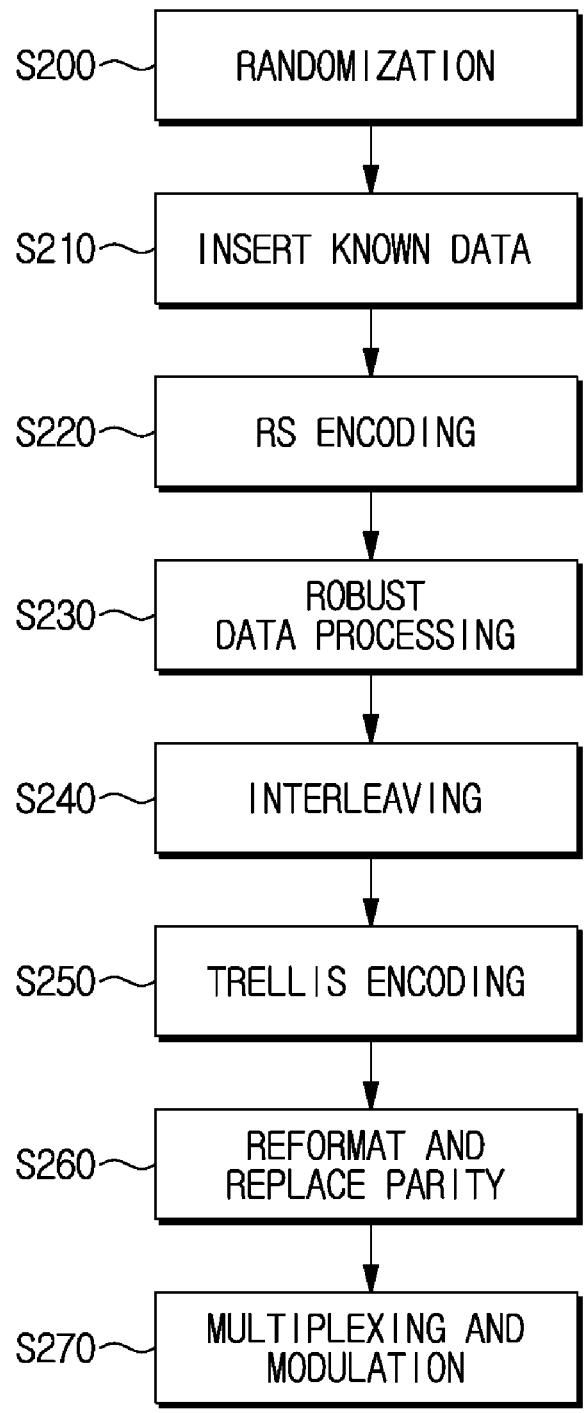
FIG. 12 is a flowchart explaining the operation of a digital broadcast transmitter according to an embodiment of the present invention.

FIG. 12 is a flowchart explaining the operation of the digital broadcast transmitter according to an embodiment of the present invention. The randomizer 210 receives the dual transport stream containing the normal stream and the robust stream to randomize the dual transport stream (S200). The stuff-byte exchange unit 215 inserts the known data into the stuff region included in the normal data of the dual transport stream randomized by the randomizer 210 (S210). When the first RS encoder 220 is input with the dual transport stream to which the known data is inserted, the first RS encoder 220 performs the RS encoding of the packet data to add the parity to the parity region included in the packet of the dual transport stream (S220).

The RS-encoded dual transport stream is input to the packet formatter 230. With the normal stream of the dual transport stream passes intact by the control signal of the controller 260. The robust stream converted into a new dual transport stream by interleaving and reformatting the packet at a ½ rate, inserting the PID value into the packet, and multiplexing the packet and the normal stream (S230).

The dual transport stream newly formatted by the packet formatter 230 is interleaved by the interleaver 240 (S240). The trellis encoder 250 converts the data output from the interleaver 240 into data symbols, and performs the symbol mapping of the data symbols through the trellis encoding at a ⅔ rate (S250). Here, the trellis encoder 250 initializes the value temporarily stored in its own memory device to a specified value at the start point of the known data, and then performs the trellis encoding of the known data.

The parity reformatter 245 performs the RS encoding of the data changed according to the initialization to generate the parity, and then inputs the generated parity to the trellis encoder 250. The trellis encoder 250 replaces the previous parity by the new parity received from the parity reformatter 245. The second RS encoder 270 replaces the original parity by the newly generated parity by performing the RS re-encoding of the robust data which is enhanced-coded by the trellis encoder 250, so as to be compatible with the existing receiver (S260). However, it is understood that if backward compatibility is not need, the additional RS encoding and parity replacement need not be performed.

The multiplexer 280 inserts the segment sync signal and the field sync signal into the dual transport stream of the trellis encoder 250 to multiplex the stream, and the modulator/RF converter 290 demodulates and RF-up-converts the stream (S270).

Figure 13:
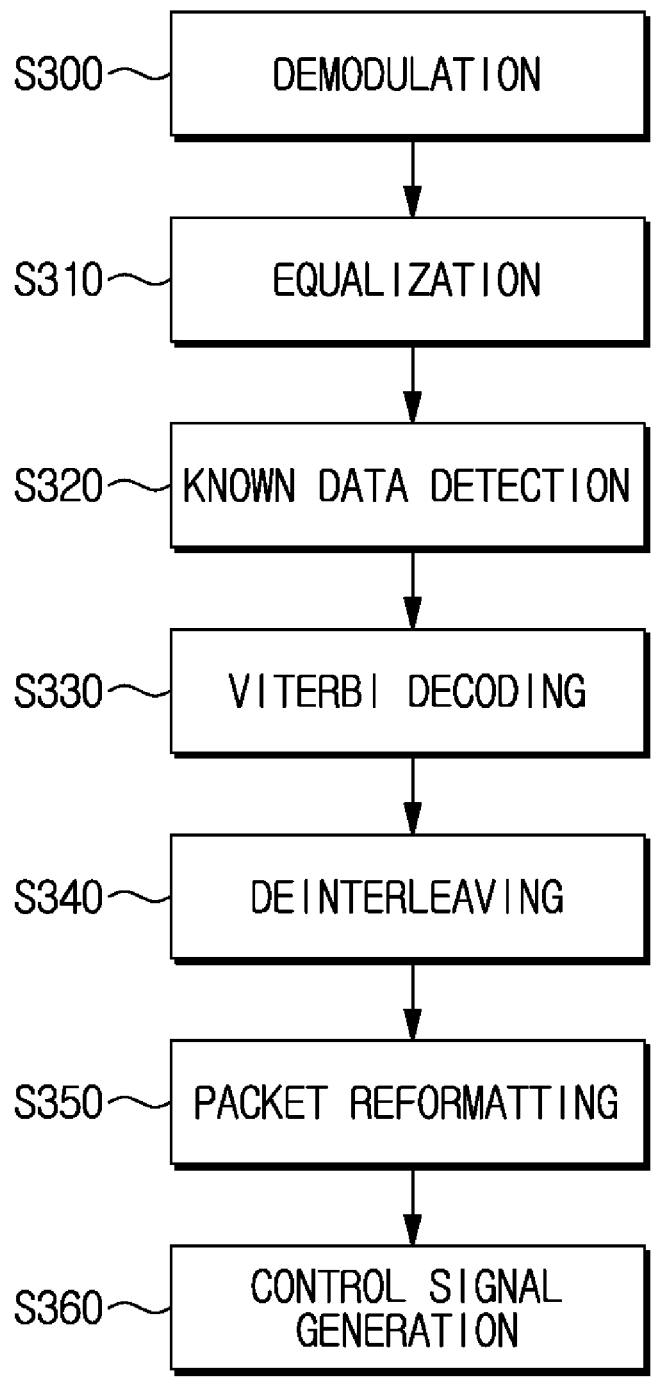
FIG. 13 is a flowchart explaining the operation of a digital broadcast receiver according to an embodiment of the present invention.

FIG. 13 is a flowchart explaining the operation of the digital broadcast receiver according to an embodiment of the present invention. When the signal containing the dual transport stream is transmitted from the digital broadcast receiver, the tuner (not shown) converts the received signal into the baseband signal. The demodulator 310 performs demodulation by detecting the sync signal and the pilot signal inserted into the baseband signal (S300). The equalizer 320 compensates for the channel distortion from the demodulated signal, and removes the interference of the received symbols (S310).

In operation S320, the known data output unit 400 detects and provides the known data to the demodulator 420 and the equalizer 430 so as to compensate for the channel distortion in operations S300 and S310. The Viterbi decoder 330 performs a Viterbi decoding of the equalized dual transport stream (S330). The deinterleaver 340 deinterleaves the Viterbi-decoded dual transport stream (S340). The packet reformatter 350 demultiplexes the deinterleaved data to divide the data into the robust data and the normal data, performs the packet reformatting and deinterleaving of the robust data, and inputs the reformatted and deinterleaved robust data and the normal data to the RS decoder 370 (S350). The RS decoder 370 error-corrects the deinterleaved data, and the derandomizer 380 derandomizes the data corrected by the RS decoder 370, so that the data of the MPEG-2 transport stream is restored (S360).

As described above, according to an aspect of the present invention, the receiving performance of the digital broadcast receiver such as the synchronization and the equalization can be improved by generating and inserting the stuff bytes into the MPEG-2 TS packet, replacing the inserted stuff bytes by the known data, and transmitting the data with the known data inserted therein, in a digital broadcast transmitter side, and by detecting the known data from the received signal and using the detected known data in a digital broadcast receiver side.

Also, since the stuff bytes are inserted into the structure of the existing transport frame and only a part of the reserved portion is modified, the digital broadcast transmitter/receiver is compatible with the existing system.

While not required in all aspects, elements of the present invention can be implemented as software and/or as hardware. It is understood that, instead of or in addition to transmission, the broadcast signal can be recorded on a medium reproducible by a decoder having a medium reading capacity.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A digital broadcast transmitter, comprising:
a Reed-Solomon (RS) encoder to RS-encode a stream to which known data was added to add a parity; and
a trellis encoder to trellis-encode the RS-encoded stream comprising normal data and additional data and to initialize a memory just prior to the trellis encoding of the known data.

2. The digital broadcast transmitter of claim 1, further comprising:
an exchanger to replace predetermined bytes included in the stream with the known data.

3. The digital broadcast transmitter of claim 1, further comprising:
a parity reformatter to generate replacement parity according to initialization of the trellis encoder to replace the added parity with the replacement parity.

4. The digital broadcast transmitter of claim 1, further comprising:
an interleaver to interleave the RS encoded stream;
wherein the known data is arranged in six parts intermittently at least one field of the interleaved stream.

5. A stream processing method of a digital broadcast transmitter, the stream processing method comprising:
Reed-Solomon (RS)-encoding a stream to which known data was added to add a parity;
trellis-encoding the RS-encoded stream comprising normal data and additional data; and
initializing a memory just prior to the trellis encoding of the known data.

6. The stream processing method of claim 5 further comprising:
replacing predetermined bytes included in the stream with the known data.

7. A digital broadcast system, comprising:
a digital broadcast transmitter to output a stream comprising normal data and additional data, the digital broadcast transmitter comprising a Reed-Solomon (RS) encoder to RS-encode the stream to which known data was added to add a parity, and a trellis encoder to trellis-encode the RS-encoded stream comprising the normal data and the additional data and to initialize a memory just prior to the trellis encoding of the known data; and
a digital broadcast receiver to receive the output stream from the digital broadcast transmitter and process the received stream.

8. The digital broadcast system of claim 7, wherein the digital broadcast receiver comprises:
a demodulator to receive the output stream from the digital broadcast transmitter and demodulate the received stream;
an equalizer to equalize the demodulated stream;
a control signal generator to generate a control signal for processing the equalized stream; and
a data reconstructor to reconstruct the equalized stream according to the generated control signal.

9. A digital broadcast transmitter, comprising:
a randomizer to receive a stream including normal data and robust additional data and randomize the stream;
a Reed-Solomon (RS) encoder to RS-encode the randomized stream to which known data was added to add a parity; and
a trellis encoder to trellis-encode the RS-encoded stream comprising the normal data and the additional data and to initialize a memory just prior to the trellis encoding of the known data.

* * * * *